3,832,275
LAMINATE AND METHOD OF PREPARATION

Paul R. Matvey, Akron, and John R. Gage, Stow, Ohio, assignors to The Goodyear Tire & Rubber Company, Akron, Ohio
No Drawing. Filed Nov. 16, 1970, Ser. No. 90,069
Int. Cl. B32b 27/40
U.S. Cl. 161—190                4 Claims

ABSTRACT OF THE DISCLOSURE

A composite of a vulcanized diene rubber with a low vapor transmission layer having a polyurethane outer layer suitable for use in making containers where the container is to be subjected to a wide range of temperature variation and it is needed to protect materials such as powder from moisture and other deleterious substances.

---

This invention relates to a method of making elastomeric composites or laminates and to said composites which have composite properties not exhibited by the individual elastomers.

Elastomeric films and containers are used for many purposes. For instance, the propellent charge for 152 millimeter missiles used in the guns on Sherman tanks is contained in an elastomeric bag or container to protect the propellent from deterioration during storage and transportation. Also, many articles are stored or encapsulated in elastomeric films or containers to await their use. Normally it is desired that these films or containers exhibit the property of very low moisture vapor transmission, good resistance to ozone and oil, and other weathering features as well as having excellent flexibility at low temperatures, high resistance to tear and an overall high toughess value. Unfortunately, none of the commercial rubbers exhibit these overall composite values and the films and containers prepared commercially are deficient in at least one or more of the above enumerated properties. Therefore, an object of this invention is to provide a method of forming films and composites such as a container which exhibits the properties indicated above. These films as tubes for tires would be desirable as they would eliminate the need for flaps.

The above objects and advantages may be obtained according to one technique by spraying a prevulcanized natural rubber latex or related polydiene upon a suitable molding or shaping surface to give a thickness of approximately 5 to 50, and preferably 10 to 30 mils, drying (preferably by heating) to remove the moisture in the latex and then applying a low moisture vapor transmission coating of rubber, such as butyl rubber, preferably in the latex form over the previous coat to a thickness of approximately 2 to 10 and preferably 4 to 8 mils, removing the moisture or solvent therein and then applying a coating of a polyurethane elastomer of at least 1 to 15 and preferably 3 to 10 mils over the barrier coat to obtain a composite which exhibits good low temperature flexibility, high tear resistance, low moisture transmission and excellent resistance to oil and ozone.

The nature of this invention is more specifically illustrated in the following illustrative examples wherein the parts are all by weight unless otherwise designated.

EXAMPLE I

A chrome plated aluminum mandrel essentially 18 inches long and 6 inches in diameter was raised to a temperature of 180 to 210° F. and given a spray coat of a prevulcanized natural rubber latex of 60 percent solids to give a coating over the mandrel of approximately 24 mils. The mandrel containing the prevulcanized natural rubber coating was placed in an open air circulation oven at 200–210° F. for 10–25 minutes. The mandrel was removed from the oven, and while still hot, a coat of butyl latex of 53 percent solids, was sprayed thereon and dried to give a coating of 4 mils of butyl rubber over the natural rubber. Again the mandrel was placed in the hot air circulating oven at 210° F. for about 10 minutes. The mandrel was removed from the oven and allowed to cool to 100 to 120° F. and a coating of polyurethane was applied thereon to give a coating of 2 to 3 mils thickness over the first two coats. The resulting bag was stripped from the mandrel and it exhibited good flexibility at −40° F., tear resistance, low moisture vapor transmission and good ozone and oil resistance.

The prevulcanized natural rubber latex used in the initial coating was prepared by heating a compounded high ammonia stabilized natural rubber latex of about 60 perecnt solids at 160° F. for 45 minutes. The compounded natural rubber was made by mixing the following ingredients (dry basis):

| Ingredients: | Parts |
|---|---|
| Natural rubber | 100 |
| Potassium oleate | 2.0 |
| Potassium hydroxide | 0.7 |
| Zinc oxide | 1.0 |
| Zinc diethyl dithiocarbamate | 0.5 |
| Sym-di-β-naphthyl-para-phenylene diamine | 1.0 |
| Butylated reaction product of para-cresol and dicyclopentadiene | 1.0 |
| Zinc salt of 2-mercaptobenzothiazole | 2.0 |
| Sulfur | 0.25 |

The butyl latex used for the low moisture vapor transmission coating was compounded as follows (on dry basis):

| Ingredients: | Parts |
|---|---|
| Butyl latex | 100 |
| Ammonium hydroxide | 2.0 |
| Zinc oxide | 5.0 |
| Sulfur | 3.0 |
| Zinc dibutyl dithiocarbamate | 4.0 |
| Antimony oxide | 10.0 |
| Chlorinated paraffin wax, 70% chlorine content | 10.0 |
| Olive drab pigment | 3.75 |

The polyurethane reaction mixture used to coat the laminate was prepared from a compounded prepolymer and isophorone diamine, where the prepolymer was the reaction product of a mol of polytetramethylene ether glycol of 2000 molecular weight with 2 mols of commercial toluene diisocyanate (80/20%, 2,6/2,4 isomers).

The prepolymer (100 parts) was mixed with 10.7 parts antimony oxide, 10.7 parts chlorinated paraffin wax having a 70 percent chlorine content, 5.0 parts of olive drab pigment, 0.4 parts dibutyl tin dilaurate and 0.50 parts of a commercial silicone leveling agent, Dow Corning paint additive 11, and then mixed with 6.9 parts of isophorone diamine to give the polyurethane reaction mixture.

If improved flame resistance of the laminate or container is desired, it is preferred that the prevulcanized natural rubber latex above be compounded further as shown below:

| Ingredients: | Parts |
|---|---|
| Prevulcanized natural rubber latex | 100 |
| Antimony oxide | 15 |
| Dibasic lead phosphite | 3 |
| Chlorinated paraffin wax, 70% chlorine content | 15 |
| Olive drab pigment | 5 |
| Dow Corning Emulsion 36 | 1.75 |

Instead of natural rubber, high cis polyisoprene rubber can be used to build up the first coat on the mandrel.

The high cis polyisoprene is compounded in the manner shown for the natural rubber. If the viscosity is too high to be readily applied by spray, roller or brush coating, then the viscosity can be cut with water. In some respects, high cis polyisoprene rubber is preferred to natural rubber as it offers greater resistance to crystallization and would be flexible at lower temperatures. Other rubbers can be used for the first coat such as butadiene-styrene, butadiene-acrylonitrile and chlorinated polyisoprene. These rubbers are compounded with sulfur, accelerators, fillers, etc., then applied as a latex or cement and cured preferably at elevated temperatures. The butyl rubber coating serves as a low moisture transmission layer. Polyvinylidene chloride available as Saran can be used in place of the butyl rubber, too. The Saran is dissolved in a suitable low boiling solvent such as acetone or methyl ethyl ketone before being sprayed, dipped or brush coated over the first rubber coat to form the low moisture transmission layer.

Any of the flexible polyurethane coatings can be used where the coating is 1 to about 5 mils but thicker coats such as 5 to 10 or more mils are preferably made from the polyurethanes having good low temperature flexibility properties.

Representative of the broad classes of reactive hydrogen containing materials useful in making these polyurethane coatings are the polyether polyols, the polyester polyols and the hydrocarbon polyols. Preferably the polyols contain only two hydroxyls or a mixture of two and three hydroxyls with the amount of the three hydroxyl polyols being about 5 to 40 percent. Usually the molecular weight of the polyol is at least about 1000 to 6000 with the preferred range being 1800 to 4000. Any of the organic di and triisocyanates can be used to make the polyurethane but the preferred class is the aromatic diisocyanates such as toluene diisocyanate and methylene di(phenylene isocyanate). The alicyclic and aliphatic diisocyanates are desirable where a nondiscoloring polyurethane is desired. Usually about 1.2 to 3.0 mols of the polyisocyanate is used for each mol of reactive hydrogen containing material with the preferred range being 1.5 to 2.5 mols.

The polyurethane can be made by the prepolymer or the one-shot technique or other methods. Normally the prepolymer is made and then mixed with a curative to obtain the cured polyurethane of the coating. The curative is usually used in either the prepolymer or one shot method to utilize about 0.5 to 0.9 mols of each mol of excess isocyanate relative to the active hydrogen containing material. Suitable curatives are the diols and triols of less than 350 molecular weight and the organic diamines. Representative examples are ethylene glycol, propylene glycol, butylene glycol, methylene di-ortho chloroaniline, ethylene diamine, and isophoronediamine.

While certain representative embodiments and details have been shown for the purpose of illustrating the invention, it will be apparent to those skilled in this art that various changes and modifications may be made therein without departing from the spirit or scope of the invention.

What is claimed is:

1. A composite of a vulcanized diene rubber of about 5 to 50 mils adhered to one side of a low vapor transmission layer of 2 to 10 mils thick composed of butyl rubber or polyvinylidene chloride and having a coating of at least 1 to 10 mils of polyurethane adhered to the other side of said layer.

2. The composite of Claim 1 wherein the vulcanized diene rubber is a vulcanized natural rubber adhered to a butyl rubber layer.

3. The composite of Claim 1 wherein the vulcanized diene rubber is a vulcanized natural rubber adhered to a polyvinylidene chloride.

4. The composite of Claim 1 wherein the vulcanized diene rubber is selected from the class of natural rubber, high cis polyisoprene rubber, butadiene-styrene rubber, butadiene-acrylonitrile rubber and chlorinated polyisoprene rubber.

References Cited
UNITED STATES PATENTS

| | | | |
|---|---|---|---|
| 2,558,807 | 7/1951 | Bailey | 161—405 X |
| 2,764,939 | 10/1956 | Phemister | 102—97 |
| 3,129,014 | 4/1964 | Hutchinson et al. | 161—405 X |
| 3,257,948 | 6/1966 | Axelrod et al. | 102—97 X |

CLIFTON B. COSBY, Primary Examiner

U.S. Cl. X.R.

161—165, 253, 254, 405